(12) United States Patent
Schmitt

(10) Patent No.: US 8,412,205 B2
(45) Date of Patent: Apr. 2, 2013

(54) METHOD OF REDUCING THE POWER CONSUMPTION IN A MOBILE RADIO NETWORK WITH AT LEAST TWO SUPPLY LAYERS

(75) Inventor: Harald Schmitt, Bendorf (DE)

(73) Assignee: Deutsche Telekom AG, Bonn (DE)

( * ) Notice: Subject to any disclaimer, the term of this patent is extended or adjusted under 35 U.S.C. 154(b) by 365 days.

(21) Appl. No.: 12/741,213

(22) PCT Filed: Oct. 13, 2008

(86) PCT No.: PCT/EP2008/008645
§ 371 (c)(1),
(2), (4) Date: May 24, 2010

(87) PCT Pub. No.: WO2009/068138
PCT Pub. Date: Jun. 4, 2009

(65) Prior Publication Data
US 2010/0234013 A1    Sep. 16, 2010

(30) Foreign Application Priority Data
Nov. 28, 2007   (DE) .......................... 10 2007 057 607

(51) Int. Cl.
*H04W 36/00* (2009.01)
(52) U.S. Cl. ..... 455/443; 455/574; 455/444; 455/422.1; 455/522; 370/311; 370/338
(58) Field of Classification Search .................. 455/574, 455/522, 422.1, 41.2, 443, 444; 370/311
See application file for complete search history.

(56) References Cited

U.S. PATENT DOCUMENTS

| | | | |
|---|---|---|---|
| 5,487,174 A * | 1/1996 | Persson | 455/444 |
| 6,125,278 A | 9/2000 | Wieczorek | |
| 6,421,529 B1 * | 7/2002 | Wing et al. | 455/67.7 |
| 7,016,710 B2 * | 3/2006 | Carmeli et al. | 455/574 |
| 7,024,186 B1 * | 4/2006 | Ishikawa et al. | 455/423 |
| 7,035,676 B2 * | 4/2006 | Ranta | 455/574 |
| 7,245,947 B2 * | 7/2007 | Salokannel et al. | 455/574 |
| 7,257,095 B2 * | 8/2007 | Liu | 370/311 |
| 7,706,846 B2 * | 4/2010 | Moon | 455/574 |
| 7,953,030 B2 * | 5/2011 | Seo et al. | 370/311 |
| 8,290,497 B2 * | 10/2012 | Tajima et al. | 455/456.1 |
| 2004/0116111 A1 * | 6/2004 | Saunders | 455/423 |

(Continued)

FOREIGN PATENT DOCUMENTS
DE  10035116 A  1/2002
GB  2316578 A  2/1998

OTHER PUBLICATIONS

Persson, H et al "Maintaining QoS by Utilizing Hierarchical Wireless Systems" Dept. of Comm. Systems of Lund University, Sweden 2003.

(Continued)

*Primary Examiner* — Sharad Rampuria
(74) *Attorney, Agent, or Firm* — Andrew Wilford

(57) ABSTRACT

The invention relates to a method for operating a mobile communications network having two or more supply levels (1, 2, 3), wherein the supply levels (1, 2, 3) overlap and are each formed by a plurality of transmission stations, wherein a first supply level (1) is defined as the standard level (1), which guarantees the availability of the mobile communications network, and a second supply level (2, 3) is at least partially and/or temporarily deactivated.

7 Claims, 2 Drawing Sheets

U.S. PATENT DOCUMENTS

| | | | |
|---|---|---|---|
| 2005/0025080 A1* | 2/2005 | Liu | 370/311 |
| 2009/0291690 A1* | 11/2009 | Guvenc et al. | 455/444 |
| 2011/0170466 A1* | 7/2011 | Kwun | 370/311 |
| 2011/0211514 A1* | 9/2011 | Hamalainen et al. | 370/311 |
| 2011/0300805 A1* | 12/2011 | Gaikwad et al. | 455/63.1 |
| 2012/0122511 A1* | 5/2012 | Antonio et al. | 455/522 |

OTHER PUBLICATIONS

Anonymous "Method to Increase power efficiency n a mixed GSM/UMTS network" Research Discl. of Mason Publications, Hampshire, GB 2003.

* cited by examiner

METHOD OF REDUCING THE POWER CONSUMPTION IN A MOBILE RADIO NETWORK WITH AT LEAST TWO SUPPLY LAYERS

CROSS REFERENCE TO RELATED APPLICATIONS

This application is the US national stage of PCT application PCT/EP2008/008645, filed 13 Oct. 2008, published 4 Jun. 2009 as WO2009/058138, and claiming the priority of German patent application 102007057607.4 itself filed 28 Nov. 2007.

FIELD OF THE INVENTION

The invention relates to a method of operating a mobile radio network which has two or more supply layers, wherein the supply layers are superimposed and are each formed by a plurality of transmitting stations.

BACKGROUND OF THE INVENTION

Modern mobile radio networks are very frequently subdivided into different supply layers. In this case, the different layers may use the same technologies, for example microcell networks in which one layer forms the macrocell layer and a further supply layer forms the microcell layer. However, different supply layers may also use different technologies, for example in the case of dual mode networks, in which GSM forms one supply layer and UMTS forms a second supply layer. It is likewise possible to combine supply layers using the same and different technologies.

This means that the supply layers are each formed by a plurality of individual transmitting stations, thus ensuring that the mobile radio network services are provided covering an area, with the spatial coverage of the supply layers being superimposed.

Modern transmitting stations are able to switch off superfluous capacities in times when the call level and load level are low. In the case of GSM transmitting stations, for example, individual radio-frequency carriers are deactivated. In the case of UMTS networks, it is likewise possible to deactivate individual radio-frequency amplifiers. In addition, in the case of UMTS transmitting stations, baseband processing capacity can be deactivated.

The known methods have the disadvantage that the switching-off actions are always carried out within a transmitting station. A further disadvantage is that only parts of the capacity are deactivated, and the basic supply for the transmitting station is not adversely affected, in order to ensure area-coverage supply with the corresponding service.

OBJECT OF THE INVENTION

The object of the invention is to provide a method which makes it possible to reduce the power consumption in a mobile radio network in times when the call level and load level are low, and thus reduce the overall operating costs, while at the same time ensuring the fundamental and continuous availability of the services offered.

SUMMARY OF THE INVENTION

It is particularly advantageous in this case, that, in the case of the method of operating a mobile radio network which has two or more supply layers where the supply layers are superimposed and are each formed by a plurality of transmitting stations, a first supply layer is defined as the standard layer which ensures the availability of the mobile radio network, and in that a second supply layer is switched off at least partially and/or temporarily.

The method according to the invention therefore deactivates entire transmitting stations or entire layers, and reactivates them when required. Only a monitoring unit within or else outside the transmitting station remains active, in order to allow the transmitting station to be activated again. Since the overall transmitting station or supply layer is deactivated, the supply to the transmitting station is also switched off. This considerably reduces the power consumption since individual transmitting stations, or a supply layer, are or is not just partially switched off, but are or is completely switched off. in this case, the fundamental availability is always ensured by the standard layer, which is operated all the time.

Individual transmitting stations in a network having a plurality of layers can be switched off when the load is low or there is no load. In order to ensure that the switching off of individual transmitting stations does not restrict the supply area and the general network availability of the mobile radio network, it is necessary to define a default layer in which no transmitting stations are switched off. This default layer guarantees the supply and general network availability.

Preferably, the load in the mobile radio network is monitored, and the second supply layer or individual transmitting stations in the second supply layer are switched off if a definable load lower limit is undershot.

In this case, the second supply layer can provide the same services as the standard layer in particular using the same technology as the standard layer. It is also possible for the second or a further supply layer to provide a different service than the standard layer, in particular using a different technology than the standard layer, and for this second or further supply layer to be switched off when the service which is provided by this layer is not demanded at that time or has not been demanded over a definable time period.

The conditions for reactivation of transmitting stations differ in accordance with the following applications. When transmitting stations which use a different technology than the default layer, that is to say the standard layer, are switched off, it may be worthwhile reactivating these transmitting stations even for the situation in which at least one terminal which supports this technology is active in the supply area. This is the case in is particular when the switched-off transmitting station supports a technology which supports functions or services which are not supported by the current transmitting station in the default layer.

Transmitting stations using the same technology can be reactivated when a load limit is exceeded in the current transmitting station. This therefore results in a network with different service layers. In general, no transmitting stations are switched off in the default layer. The load layer which can be switched off contains transmitting stations using the same technology as the default layer. The criterion for switching off transmitting stations in this layer is a low call level in the default layer and load layer. The trigger condition for reactivating transmitting stations in the load layer is an increased call level in the default layer, that is to say in the first supply layer, the standard layer. The service layer which can be switched off, that is to say the second or further supply layer, contains transmitting stations using different technology than the default layer, and supports different services and functions. The condition for switching off transmitting stations in this layer is inactivity over a certain time, or finding that the service offered by this layer is currently not being demanded.

The condition for reactivation of a transmitting station in this layer is activity of a terminal which supports the technology of the service layer which can be switched off, in the default layer or load layer in the supply area of the transmitting station to be switched on.

Load monitoring is preferably carried out for each transmitting station, and in particular individual transmitting stations can be temporarily switched off.

A transmitting station is preferably switched off by continuously reducing the output transmitted power to zero, and not by suddenly switching off the transmitting station.

One problem of switching off an individual transmitting station is that all the terminals which are registered with the transmitting station to be switched off will search for another available transmitting station at the same time, and will register there. This may possibly produce a sudden signaling load. In order to avoid these signaling peaks, it is proposed that the transmitting stations not be switched off at a defined time, but that the output power of the transmitting station be slowly reduced to zero, that is to say be reduced continuously rather than suddenly. In consequence, the terminals will not all change transmitting station at the same time. Terminals which are further away from the transmitting station will change earlier than terminals which are located close to the transmitting station.

The first supply layer may be formed by GSM transmitting stations. The second and/or a further supply layer may likewise be formed by GSM transmitting stations. Alternatively or cumulatively, a second and/or a further supply layer may be formed by UMTS transmitting stations. This allows widely differing services to be provided, and allows load peaks in the mobile radio network to be coped with by spatial superimposition with identical transmitting stations and technologies.

The switching state of transmitting stations in the second and/or a further supply layer or of individual transmitting stations in the second and/or a further supply layer is preferably monitored by a monitoring unit, and in particular the standard layer may have monitoring units such as these.

Transmitting stations in a second and/or a further supply layer in the mobile radio network can be switched on when a definable load level is exceeded and/or when particular services which are offered by these transmitting stations are called up in the mobile radio network.

In one preferred embodiment, the current switching state of a transmitting station is transmitted by means of a protocol to a monitoring unit when a request and/or a switching instruction of a monitoring unit has been received and/or when the switching state of the transmitting station has changed after receiving a switching instruction.

In order to reactivate individual transmitting stations in the load layer or service layer, it is necessary to inform the relevant transmitting stations that a criterion for reconnection in the default layer or in the load layer has been reached. In this case, it should be noted that the criterion for switching on a transmitting station in the load layer may occur only in the default layer. The criterion for switching on a transmitting station in the service layer may occur in the default layer and load layer. It is also necessary for the transmitting stations in the default layer to manage the switched-on state of the transmitting stations in the service layer and load layer. Transmitting stations in the load layer must manage the switched-on state of transmitting stations in the service layer. This is necessary in order that these transmitting stations will generate appropriate commands to the transmitting stations to be switched on when a switch-on trigger occurs, that is to say when the switch-on condition occurs. It should be noted that only the states of transmitting stations which have the same supply area need be managed.

A protocol between the transmitting stations is useful in order to signal changes in the switched-on state to the corresponding transmitting stations or monitoring units. Furthermore, the protocol supports a command for switching on the transmitting station in the situation when the appropriate trigger condition (switch-on condition) is reached. Furthermore, the protocol is intended to support commands for checking the switched-on status of individual transmitting stations (NodeB).

The protocol preferably supports the following communications and commands:

Check of the switched-on state:
POWER STATUS REQUEST checks the switched-on state of a transmitting station.
POWER STATUS RESPONSE contains the current switched-on state of a transmitting station.
Information interchange relating to switching off a transmitting station:
POWER SWITCHOFF indicates that the trigger condition for switching off a transmitting station has been reached, and switches off the transmitting station.
POWER SWITCHOFF ACK acknowledges reception of a POWER SWITCHOFF message.
Check of the switched-on state in the case of a switch-on command:
POWER SWITCHON REQUEST requests reactivation of a transmitting station.
POWER SWITCHON ACK contains the indication that a transmitting station has been switched on successfully.

BRIEF DESCRIPTION OF THE DRAWING

The method will be explained in the following text and is illustrated in the figures, in which.

DETAILED DESCRIPTION

Figure 1:
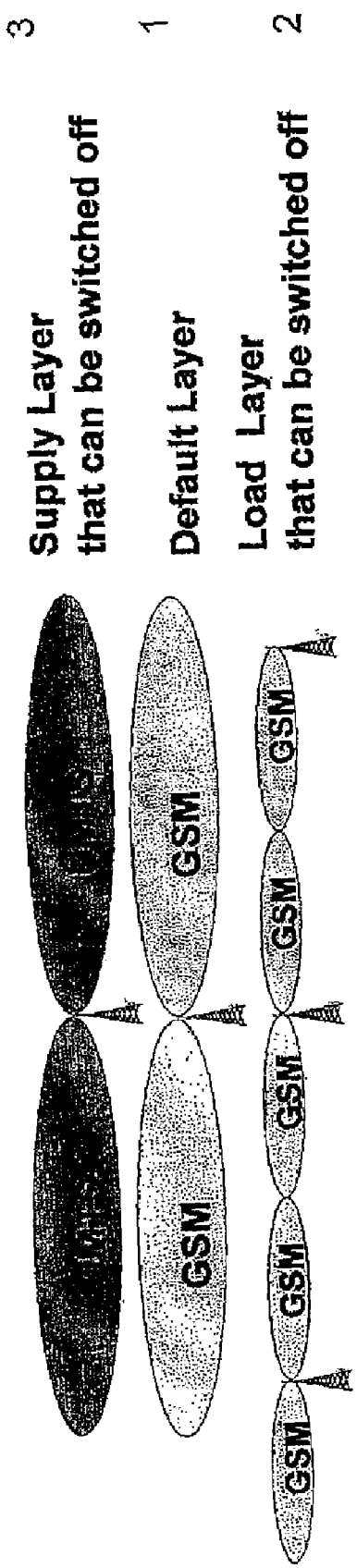
FIG. 1 shows a schematic illustration of the configuration of a mobile radio network with a plurality of supply layers.

FIG. 1 shows a schematic illustration of the configuration of a mobile radio network with a plurality of supply layers 1, 2, 3.

The mobile radio network is formed by a plurality of layers 1, 2, 3, with a first supply layer, which defines default layer 1 as the standard layer 1, ensuring that the mobile radio services are available all the time and are therefore always kept in operation. In addition, FIG. 1 shows a second supply layer 2, specifically the additional load layer 2, which is based on the same technology as the standard layer 1, in the illustrated example GSM. Furthermore, the mobile radio network has a further supply layer 3 in the form of a service layer 3 which can be switched off and provides a different service than the standard layer 1, and which is illustrated by way of example as a UMTS network.

The supply layers 1, 2, 3 are each formed by a multiplicity of individual base stations (NodeB) in order to ensure supply covering an area as far as possible, wherein the layers 1, 2, 3 are spatially superimposed, that is to say the radio ranges of the base stations of the various layers 1, 2, 3 at least partially cover one another. The spatial (geographic) coverage of the standard layer 1 and load layer 2 makes it possible to cope with load peaks that occur, and the spatial (geographic) coverage of the standard layer 1 and service layer 3 allow different services, in this case GSM and UMTS connections to be offered in the same region.

As shown in FIG. 1, the layers may use the same technologies, for example microcell networks in which a first layer 1 forms the macrocell layer, and a further supply layer 2 forms the microcell layer. However, different supply layers may also use different technologies, for example in the case of dual mode networks in which GSM forms a supply layer 1 and UMTS a second or further supply layer 3. The configuration illustrated in FIG. 1 shows a combination of supply layers using the same technology (layers 1, 2) and different technology (layer 3), which is likewise possible.

Individual transmitting stations in the network with a plurality of layers 1, 2, 3 can be switched off when the load is low or there is no load. In order to ensure that switching off individual transmitting stations does not restrict the supply region and the general network availability of the mobile radio network, it is necessary to define a default layer 1 in which no transmitting stations are switched off. This default layer 1, that is to say the standard layer 1, guarantees the supply and the general network availability.

The conditions for reactivation of transmitting stations are distinguished in accordance with the following applications. When transmitting stations which use a different technology (layer 3) than the default layer 1 are switched off, it may be worthwhile to actually reactivate these transmitting stations in the situation when at least one terminal, that is to say a mobile radio terminal which supports this technology, becomes active in the supply area. This is the case when the switched-off transmitting station supports a technology which supports functions or services which are not supported by the current transmitting station in the default layer 1.

Transmitting stations using the same technology (layer 2) can be reactivated when a load limit is exceeded in the current transmitting station. This results in a network with different service layers 1, 2, 3. Generally, no transmitting stations are switched off in the default layer 1. The load layer 2 which can be switched off contains transmitting stations using the same technology as the default layer 1. The criterion for switching off transmitting stations in this layer (load layer 2) is a low call level in the default layer 1 and load layer 2. The trigger condition, that is to say the switch-on condition for reactivation of transmitting stations in the load layer 2 is an increased call level in the default layer 1.

The service layer 3 which can be switched off contains transmitting stations using different technology than the default is layer 1 and supports different services and functions. The condition for switching off transmitting stations in this layer 3 is inactivity over a certain time. The condition for reactivation of a transmitting station in this layer 3 is activity of a terminal which supports the technology of the service layer 3 which can be switched off and is registered in the default layer 1 or load layer 2 in the supply area of the transmitting station which can be switched on in the service layer 3.

Figure 2:
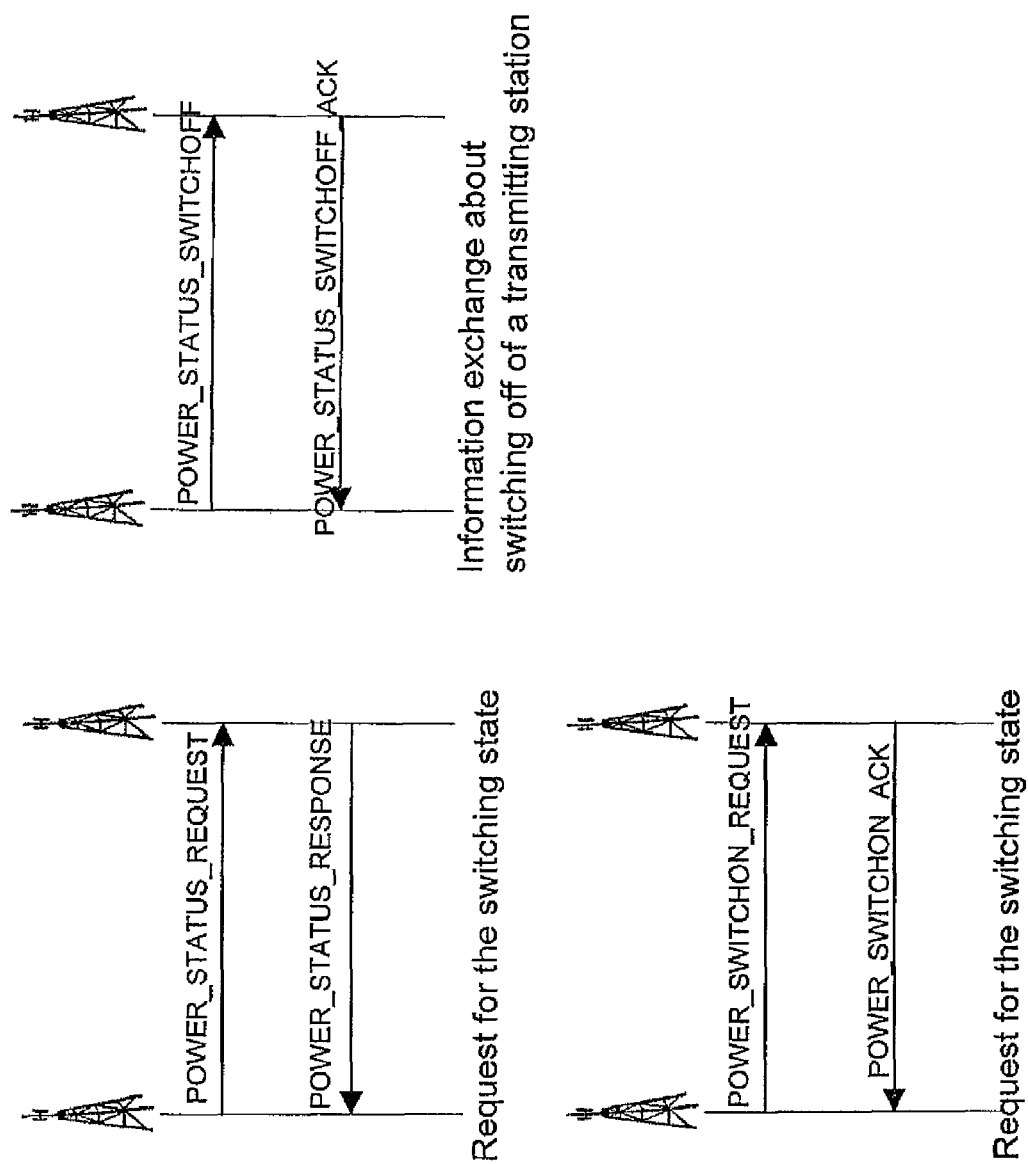
FIG. 2 shows an illustration of the communication between two transmitting stations.

FIG. 2 shows communication protocols between a first transmitting station in the standard layer 1, which has a monitoring unit, and a second transmitting station in a second layer 2 or further layer 3.

In order to reactivate individual transmitting stations in the load layer 2 or service layer 3 it is necessary to inform the relevant transmitting stations that a criterion for reconnection has been achieved in the default layer 1 and/or in the load layer 2.

In this case, it should be noted that the criterion for switching on a transmitting station in the load layer 2 can occur only in the default layer 1. The criterion for switching on a transmitting station in the service layer 3 may occur in the default layer 1 and load layer 2.

It is also necessary for the transmitting stations in the default layer 1 to manage the switched-on state of the transmitting stations in the service layer 3 and load layer 2. Transmitting stations in the load layer 2 have to manage the switched-on state of transmitting stations in the service layer 3. This is necessary in order to ensure that these transmitting stations generate appropriate commands to the transmitting stations to be switched on when a switch-on trigger is reached, that is to say on reaching a switch-on condition. In this case, it should be noted that only the states of transmitting stations which have the same supply area need be managed.

A protocol is necessary between the transmitting stations in order to signal changes in the switched-on state to the corresponding transmitting stations. Furthermore, the protocol supports a command for switching on the transmitting station for the situation in which the corresponding trigger condition is reached. The protocol is furthermore intended to support commands in order to check the switched-on status of individual transmitting stations (NodeB).

RIM (RAN Information Management) can be used as a basis for a protocol such as this, as defined in 3GPP TS 48.018: "General Packet Radio Service (GPRS); BSS GPRS Protocol (BSSGP)".

Based on RIM, additional Application Power Saving is carried out using the commands illustrated in FIG. 2:

POWER STATUS REQUEST checks the switched-on state of a transmitting station.

POWER STATUS RESPONSE contains the current switched-on state of a transmitting station as a response.

POWER SWITCHOFF indicates that the trigger condition for switching off a transmitting station has been reached, and switches off the transmitting station.

POWER SWITCHOFF ACK acknowledges reception of a POWER SWITCHOFF message.

POWER SWITCHON REQUEST requests the reactivation of a transmitting station.

POWER SWITCHON ACK contains the indication that a transmitting station has been successfully switched on.

The invention claimed is:

1. A method for operating a mobile radio network which has two or more supply layers that overlay each other and are each formed by a plurality of transmitting stations, the method comprising the steps of:

defining a first supply layer as the standard layer that ensures the availability of the mobile radio network and a second or further supply layer that provides a different service and belongs to a different technology than the standard layer, switching off the transmitting stations of the second or further layer at least partially or temporarily when the service provided by this layer is not requested or has not been requested for a defined time period, and reactivating a deactivated transmitting station of the second or further service layer as soon as at least one terminal that supports the technology of this second or further service layer becomes active in a service area of the deactivated transmitting station.

2. The method as claimed in claim 1, further comprising the steps of:

monitoring the load in the mobile radio network, and switching off the second supply layer or individual transmitting stations in the second supply layer if a definable load lower limit is undershot.

3. The method as claimed in claim 1, further comprising the step of:
monitoring load at each transmitting station of the second or further layer.

4. The method as claimed in claim 1 wherein a transmitting station of the second or further layer is switched off by continuously reducing its output transmitted power to zero.

5. The method as claimed in claim 1, further comprising the step of:
monitoring the switching state of transmitting stations of the second or further supply layer by a monitoring unit of the standard layer.

6. The method as claimed in claim 1, further comprising the step of:
switching on transmitting stations in the second or a further supply layer when a definable load level is exceeded or if particular services offered by the transmitting stations of the second or further supply layer are required in the mobile radio network.

7. The method as claimed in claim 1, further comprising the step of:
transmitting the current switching state of a transmitting station by means of a protocol to a monitoring unit if a request or a switching instruction of a monitoring unit has been received or when the switching state of the transmitting station has changed after receiving a switching instruction.

\* \* \* \* \*